United States Patent

[11] 3,630,704

[72] Inventors Harmon M. Garfinkel
Horseheads;
Joseph S. Olcott, Painted Post, both of N.Y.
[21] Appl. No. 805,457
[22] Filed Mar. 10, 1969
[45] Patented Dec. 28, 1971
[73] Assignee Corning Glass Works
Corning, N.Y.

[54] METHOD FOR STRENGTHENING GLASS ARTICLES
7 Claims, 5 Drawing Figs.

[52] U.S. Cl................................................... 65/30,
65/114, 117/124
[51] Int. Cl................................................... C03c 21/00
[50] Field of Search.......................................... 65/30, 114;
117/124

[56] References Cited
UNITED STATES PATENTS
3,287,201  11/1966  Chisholm et al................  65/30 X
3,395,998  8/1968  Olcott..............................  65/30

*Primary Examiner*—S. Leon Bashore
*Assistant Examiner*—John H. Harman
*Attorneys*—Clarence R. Patty, Jr. and Clinton S. Janes, Jr.

ABSTRACT: This invention relates to the production of chemically strengthened sodium and/or potassium silicate glass articles utilizing a consecutive ion exchange reaction involving ion exchange media containing lithium ions. In carrying out the process of the invention, a surface of the glass article is first contacted with an external source of lithium ions at a temperature above the strain point of the glass but below the softening point thereof and, thereafter, this surface is contacted with an external source of lithium ions at a temperature above 200° C. but below the strain point of the glass.

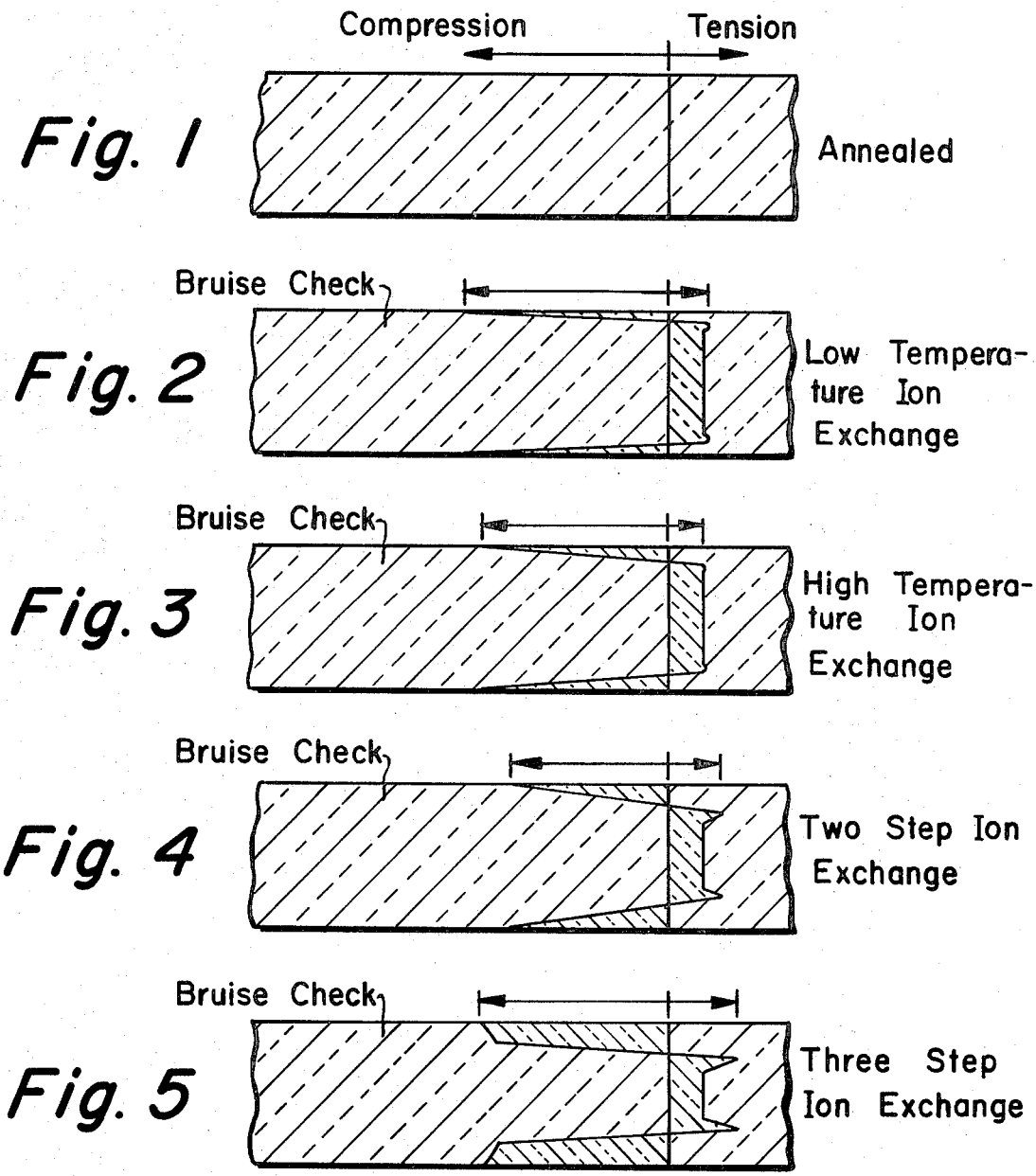

METHOD FOR STRENGTHENING GLASS ARTICLES

It has been long recognized that the strength of a glass article can be considerably increased by introducing a stress of substantially uniform compression into a surface layer within the glass article. This has been accomplished for many years through thermal tempering and, very recently, through ion exchange.

In thermal tempering, a glass article is heated to a temperature approaching the softening point of the glass and then the article is rapidly chilled to below the strain point of the glass. This rapid quenching of the article "freezes" the surface glass while the interior of the article retains some viscous flow. Hence, when the article is cooled to room temperature, compressive stresses are set up in this surface glass such that a surface compression layer is developed within the article. Thermal tempering, as commercially practiced, normally provides glass articles exhibiting a modulus of rupture of about two to three times that of a corresponding annealed glass article. However, it would be desirable to produce glass articles of even greater strengths and, further, thermal tempering is not operable with thin-walled glass articles or articles with widely varying wall thicknesses.

Within the past decade, methods for the chemical strengthening of certain glass compositions have been discovered. These methods involve exposing a glass surface to an external source of ions which at elevated temperatures will exchange with an ion present in the glass composition. These processes, then, produce a surface layer of glass having a composition differing from that of the parent glass. Hence, these processes have been referred to as chemically strengthening to distinguish them from the physical strengthening of glass through thermal tempering.

Two principal methods for chemically strengthening glass articles have been disclosed in the prior art. The first is exemplified by U.S. Pat. No. 2,779,136 wherein sodium and/or potassium silicate glass articles are contacted with a source of lithium ions at a temperature above the strain point of the glass but below the softening point thereof for a sufficient length of time to cause the replacement of sodium and/or potassium ions in the glass surface with lithium ions. Inasmuch as the exchange is undertaken at a temperature above the strain point of the glass article, viscous flow occurs within the surface such that a lithium silicate glass surface layer is actually formed which has a lower coefficient of thermal expansion than the interior parent glass. Therefore, when the ion exchanged article is cooled below the strain point thereof, a surface compression layer is produced within the article. The second method for chemically strengthening glass articles is disclosed in British Pat. No. 917,338 wherein alkali metal silicate glasses are contacted with a source of alkali metal ions having an ionic radius greater than that of the alkali metal ion in the glass at an elevated temperature below the strain point of the glass for a sufficient length of time to cause the replacement of the smaller alkali metal ions in the surface of the glass articles with the larger alkali metal ions. Since this exchange is carried out at a temperature below the strain point of the glass, viscous flow is essentially absent and compressive stresses are set up in a surface layer due to the "crowding in" of the larger alkali metal ions into sites originally occupied by the smaller ions.

U.S. Pat. No. 3,395,998 describes a unique combination of these two methods in imparting increased strength to glass articles. That invention contemplates contacting an alkali metal silicate glass with a source of alkali metal ions having a smaller ionic radius than that of the alkali metal ion in the glass at a temperature above the transformation range of the glass for a sufficient length of time to cause the replacement of the larger original alkali metal ions in the surface of the glass with the smaller alkali metal ions. Thereafter, the glass is removed from contact with the smaller alkali metal ions and heated at a temperature between about 200° C. and the transformation range of the glass for a sufficient length of time to cause an exchange to occur between the smaller alkali metal ions from the surface layer and the larger alkali metal ions from the interior portion of the glass. Hence, the smaller ions migrate toward the interior of the article and are in turn replaced in the surface layer with the larger ions. And, since this exchange takes place at a temperature below the transformation range of the glass, viscous flow is essentially absent and a surface compression layer is produced through the crowding in of the larger ions into sites previously occupied by the smaller ions.

It can be observed that these three patents envisage a compression layer within a glass article beginning at the surface thereof and extending inwardly therefrom. This surface compression layer truly enhances the strength of a glass article but this placement of the compression layer is disadvantageous for certain product applications. For example, one serious shortcoming has been observed in the use of chemically strengthened glass tumblers and glass sheets for aircraft or automobile windshields. This has involved the phenomenon which has been denominated as spontaneous or delayed breakage. Hence, despite the apparently very favorable strength characteristics, a serious breakage problem has been encountered during laboratory and consumer testing of such chemically strengthened glassware. Such breakage was further observed in nature and made all the more frustrating by the fact that it occurred in a random fashion. Thus, a drinking glass might break in washing, handling in service, or even while just standing on a shelf.

Extensive studies of this breakage led to the conclusion that it originated from very minute checks formed perpendicularly to a glass surface resulting from a forcible impact against the surface, as, e.g., by one tumbler against another or a piece of gravel striking a windshield. These studies led also to the conclusion that a kind of delayed breakage was involved in that sometimes the actual fracture of an article took place a considerable time after the break source was initially introduced into the glass surface. This type of glass damage has been termed a "bruise check."

The origin of these bruise checks has been postulated as resulting from the manner in which impacts are borne by a glass surface. Hence, the actual contact commonly occurs at a point or a very small area on the glass surface. This point loading characteristic results in a very high force per unit area being applied to a minute area on the glass surface which generates large stresses within the glass surface. Even more important, however, is the fact that a very high-tensile stress is developed within the surface adjacent to the point of impact.

This high-tensile stress leads to the production of a small check in the glass surface. The depth of this check may not be sufficient to cause immediate breakage but it may be sufficient to allow propagation thereof into the zone of equalizing tensile stress immediately beneath the surface compression layer during subsequent handling, washing, or other use of the glass article.

Hence, checks in a glass surface are classifiable into three categories: (1) checks which are so shallow as to cause no apparent damage; (2) checks resulting from such severe impacts that penetration into the tensile stress zone occurs immediately; (3) and a check intermediate these extremes, i.e., its depth is not great enough to cause immediate breakage but is sufficient to permit the propagation of the checks, e.g., by moisture entry, to a point where spontaneous breakage will occur.

Another factor which must be considered in the case of aircraft and automobile windshields is the breakage pattern which the glass demonstrates when fracture occurs. Hence, if breakage does occur, the windshield should not break into such small pieces ("direct") that the operator's view is obstructed. Likewise, in drinking glasses the violence of breakage must not be such as to injure the user.

The principal object of this invention, therefore, is to provide a method for chemically strengthening glass articles which will eliminate delayed breakage therein and which will not result in violent breakage upon fracture thereof.

One approach which has been taken to solve the problem of delayed breakage has involved an ion exchange treatment of the large-ion-for-small-ion-type at temperatures below the strain point of the glass for extended periods of time so that the depth of the compression layer was substantially increased. Nevertheless, although delayed breakage was reduced by this practice, the extended treatment times were unattractive from the commercial point of view and, even more importantly, the articles broke with explosive fragmentation when breakage did occur.

Another method which has been proposed for dealing with this problem has involved a two-step treatment wherein the glass article is first thermally tempered and then subjected to the large-ion-for-small-ion-type exchange at temperatures below the strain point of the glass. In this method, a composite surface compression layer is generated through a combination of one layer which extends relatively deep below the glass surface but has a lower magnitude of compressive stress (thermal tempering) and a second layer which is of lower depth but has a greater magnitude of compressive stress (chemical strengthening). This practice also greatly reduced the delayed breakage problem and glass tumblers strengthened in this manner have been used in restaurants. However, the violence of breakage, while much reduced from the explosive fragmentation resulting from the extended chemical strengthening technique described above in the previous paragraph, is still higher than would be desirable. Also, thermal tempering of the curved windshields used in automobiles would be extremely difficult at best.

This invention provides a method for strengthening glass articles such that the tendency toward delayed breakage is reduced and the violence of breakage is low when fracture does occur. This method contemplates a two-step ion exchange treatment being applied to sodium and/or potassium silicate glass articles. Thus, such a glass article is first exposed to a source of exchangeable lithium ions at a temperature above the strain point of the glass but below the softening point thereof for a sufficient length of time to cause the replacement of sodium and/or potassium ions within a surface layer on the article with lithium ions. The article is then exposed to a source of exchangeable lithium ions at a temperature of at least 200° C. but below the strain point of the glass for a sufficient length of time to cause an exchange to occur between the sodium and/or potassium ions in the interior portion of the article with the lithium ions of the surface layer, the contacting lithium ion source providing a reservoir of lithium ions to insure the further migration of the lithium ions towards the interior of the glass article and to replace sodium and/or potassium ions remaining in the surface layer after the first exchange.

The exchange of lithium ions for sodium and/or potassium ions at temperatures below the strain point of the glass, as is explained in U.S. Pat. No. 2,779,136, normally introduces tensile stresses in the surface of the glass leading to crazing and spalling thereof. However, this phenomenon does not occur here, its absence being deemed to result from the fact that the principal exchange occurring is essentially a sodium and/or potassium for lithium exchange within the glass, since the lithium-containing surface glass developed in the high-temperature ion exchange reaction is relatively free from either sodium or potassium ions.

To further illustrate the invention, reference is made to the accompanying drawings of stress profiles diagrammatically representing the stress distribution in a characteristic stress pattern wherein:

FIG. 1 is a sectional view taken through a flat body of annealed glass;

FIG. 2 is a sectional view taken through a flat body of glass strengthened utilizing the large-ion-for-small-ion-type exchange at a temperature below the strain point of the glass;

FIG. 3 is a sectional view taken through a flat body of glass strengthened utilizing the small-ion-for-large-ion-type exchange at a temperature above the strain point of the glass;

FIG. 4 is a sectional view taken through a flat body of glass having the composite stress pattern introduced therein in accordance with the instant invention;

FIG. 5 is a sectional view taken through a flat body of glass having the composite stress pattern introduced therein through an optional modification of the instant invention.

The horizontal lines in each figure depict the surface of a flat glass article. Centrally positioned in each figure is a vertical solid line representing the actual thickness of the article and also serving as a zone reference line for a stress profile, i.e., a plotted curve indicating the magnitude, type, and rate of stress change at any given depth in the article. Hence, with this line as a zero reference line, compressive stress values (in thousands of p.s.i.) are plotted to the left of the line and the tensile stress values are plotted to the right of the line. The horizontal displacement of any point on the resulting stress profile curve in FIGS. 2–5 exhibits the magnitude of stress at the corresponding depth in the glass article. Finally, the points at which the stress profile curve intercepts the zero stress line denote the depth of the compressive stress layer in the article and the plane at which the type of stress in the article changes from compressive to tensile.

Each of the stress profiles in the FIGURES corresponds to an actual profile observed in a 3/32-inch square bar of a sodium aluminosilicate glass given a typical treatment of the indicated type. The observations were made with conventional stress measuring equipment utilizing a Babinet-type polarimeter compensator eyepiece. Nevertheless, each actual profile may be subjected to a degree of variation of altering the glass composition, the thickness of the article, the extent and temperatures of treatment, as well as other conditions. Therefore, while drawn from actual data taken from typical treatments, these stress profiles should be deemed as essentially diagrammatic or illustrative in nature only.

An annealed glass article has, by definition, been heat treated in such a manner above the annealing point of the glass to remove all existing stress and thereafter cooled in such a manner that no appreciable amount of unrelieved stress is introduced. This absence of stress in the glass bar is demonstrated in FIG. 1 by a stress profile which is coincident with the vertical line of zero stress.

FIG. 2 represents a typical stress distribution pattern achieved through chemically strengthening glass, particularly through the large-ion-for-small-ion-type exchange at a temperature below the strain point of the glass. As is apparent from the figure, the stress profile is characterized by a very high-compressive stress value at the glass surface with a relatively thin compression layer. Hence, the compression stress condition increases rapidly with depth and changes rather abruptly to a relatively constant tension value at a point quite close to the surface of the article. This factor, coupled with the very high-stress value obtaining in the surface, produces a sharp stress gradient within the glass and a "square" profile that is generally typical of this type of chemical strengthening practice.

It is believed that the bruise check problem of delayed breakage, which has been worrisome in the chemical strengthening of glass articles, can be understood in the light of this stress profile. Thus, if a minute check caused by an impact extends into, but not through, the compression zone adjacent the zero or stress transition line, it may cause spontaneous breakage to occur later when the check propagates through the compression layer into the zone of tensile stress. A check condition which would propagate and thereby trigger spontaneous delayed breakage is illustratively depicted by a wavy line extending into the glass bar of FIG. 2 from the upper surface toward the left side.

FIG. 3 represents typical stress profiles obtained through chemically strengthened glass articles utilizing the small-ion-for-large-ion-type exchange at temperatures above the strain point of the glass. As can be observed from the figure the stress pattern has a shape very similar to that of FIG. 2, although the value of the compressive stress is not as high, and such articles exhibit the same failings with respect to delayed breakage and violence of breakage. The wavy line extending into the glass bar of FIG. 3 from the upper surface toward the left side represents the check which would propagate and thereby cause spontaneous delayed breakage.

Stress profile studies, supplemented with evidence gathered from laboratory and field service tests, have indicated that the problem of delayed breakage produced by bruise checks is alleviated as the transition point between compressive stress and tensile stress is moved deeper into the glass article. Hence, it has been found that the compressive layer should extend at least 10–15 mils in depth from the surface of drinking glasses, since checks exceeding that depth invariably cause instantaneous breakage whereas checks associated with delayed breakage generally extend about 5–10 mils into the glass body. However, as has been explained above, such articles break too violently for safety when fracture does occur.

The composite type of stress profile recorded in FIg. 4 is particularly desirable inasmuch as high resistance to applied load is obtained wit excellent protection against delayed breakage due to surface impact and very low violence of breakage upon fracture.

Table I records the compositions of three glasses, expressed in weight percent on the oxide basis, operable in this invention accompanied with measurements of the softening point, annealing point, and strain point of each. The batch ingredients therefor may comprise any materials, either the oxides or other compounds which, upon being melted together, are converted to the desired oxide composition in the proper proportions. The batch ingredients were mixed together thoroughly, examples 1 and 2 melted at about 1,600°–1,650° C., and example 3 was melted at 1,450° C. Cane about one-fourth inch in diameter was hand drawn from the melts and the remainder thereof poured into steel molds yield a square patty about 5 inches × ½ inch thick. The glass bodies were transferred to an annealer operating at about 600° C. The cane samples were cut into 4-inch long test pieces suitable for mounting in a bending apparatus designed for determining breaking load data from which moduli of rupture could be calculated.

TABLE I

|  | 1 | 2 | 3 |
|---|---|---|---|
| $SiO_2$ | 60 | 61.4 | 73.6 |
| $Al_2O_3$ | 18 | 16.8 | 1.0 |
| $Na_2O$ | 15 | 12.7 | 16.6 |
| $K_2O$ | 1 | 3.7 | — |
| MgO | — | 3.7 | 3.6 |
| CaO | — | 0.2 | 5.2 |
| $TiO_2$ | — | 0.8 | — |
| $As_2O_3$ | — | 0.7 | — |
| $Li_2O$ | 1.0 | — | — |
| $P_2O_5$ | 5.0 | — | — |
| Softening Point | 840° C. | 871° C. | 696° C. |
| Annealing Point | 584° C. | 624° C. | 510° C. |
| Strain Point | 553° C. | 574° C. | 470° C. |

The cane test samples were divided into groups of six with each group being given the strengthening treatment reported in table II. Inasmuch as the mechanical strength of these glass articles is a function of the surface compression layer developed thereon by means of the ion exchange reactions, and whereas virtually all service applications for these articles will produce surface injury thereto even if only that sustained during normal handling and shipping, the permanent or practical strength exhibited by these glasses is that which is demonstrated after substantial surface abrasion thereof. Therefore, after the chemical strengthening treatment, each cane sample was subjected to a surface abrasion procedure wherein cane samples were mixed with 200 cc. of 30 grit SiC particles and tumbled for 15 minutes in a No. 0 ballmill jar rotating at 90–100 r.p.m. The modulus of rupture for each cane was then obtained utilizing conventional measuring techniques.

In the subsequent examples, baths of molten salts were employed as the sources of exchangeable ions although it will be recognized that other sources of exchangeable ions can be utilized which are useful at the temperatures operable in this invention. Hence, the use of pastes and vapors is well known in the ion exchange staining arts. Further, it will be apparent that the most rapid rate of exchange and the highest strengths will commonly be effected where pure materials are utilized as the exchange medium although some minor contamination can be tolerated.

TABLE II

| Ex. No. | Strengthening treatment | Abraded strength (MOR) |
|---|---|---|
| 1 | None as annealed | 7,000 |
| 1 | Immersed in $KNO_3$ at 500° C. for 4 hours | 40,000 |
| 1 | Immersed in 80 mole percent $Li_2SO_4$-20 mole percent LiCl at 750° C. for 5 minutes. | 14,000 |
| 1 | Immersed in 80 mole percent $Li_2SO_4$-20 mole percent LiCl at 750° C. for 15 minutes. | 16,000 |
| 1 | Immersed in 80 mole percent $Li_2SO_4$-20 mole percent LiCl at 750° C. for 5 minutes, immersed in $LiNO_3$ at 350° C. for 1 hour. | 34,000 |
| 1 | Immersed in 80 mole percent $Li_2SO_4$-20 mole percent LiCl at 750° C. for 5 minutes, immersed in $LiNO_3$ at 350° C. for 2 hours. | 36,000 |
| 1 | Immersed in 80 mole percent $Li_2SO_4$-20 mole percent LiCl at 750° C. for 5 minutes, immersed in $LiNO_3$ at 350° C. for 3 hours. | 37,000 |
| 1 | Immersed in 80 mole percent $Li_2SO_4$-20 mole percent LiCl at 750° C. for 5 minutes, immersed in $LiNO_3$ at 350° C. for 4 hours. | 34,000 |
| 1 | Immersed in 80 mole percent $Li_2SO_4$-20 mole percent LiCl at 750° C. for 5 minutes, immersed in $LiNO_3$ at 350° C. for 5 hours. | 32,000 |
| 1 | Immersed in 80 mole percent $Li_2SO_4$-20 mole percent LiCl at 750° C. for 5 minutes, immersed in $LiNO_3$ at 350° C. for 6 hours. | 30,000 |
| 1 | Immersed in 80 mole percent $Li_2SO_4$-20 mole percent LiCl at 750° C. for 15 minutes, immersed in $LiNO_3$ at 350° C. for 1 hour. | 31,000 |
| 1 | Immersed in 80 mole percent $Li_2SO_4$-20 mole percent LiCl at 750° C. for 15 minutes, immersed in $LiNO_3$ at 350° C. for 2 hours. | 32,000 |
| 1 | Immersed in 80 mole percent $Li_2SO_4$-20 mole percent LiCl at 750° C for 15 minutes, immersed in $LiNO_3$ at 350° C. for 3 hours. | 31,000 |
| 1 | Immersed in 80 mole percent $Li_2SO_4$-20 mole percent LiCl at 750° C. for 15 minutes, immersed in $LiNO_3$ at 350° C. for 4 hours. | 31,000 |
| 1 | Immersed in 80 mole percent $Li_2SO_4$-20 mole percent LiCl at 750° C for 15 minutes, immersed in $LiNO_3$ at 350° C. for 6 hours. | 30,000 |
| 1 | Immersed in 80 mole percent $Li_2SO_4$-20 mole percent LiCl at 760° C. for 5 minutes, immersed in $LiNO_3$ at 360° C. for 2 hours. | 36,000 |
| 1 | Immersed in 80 mole percent $Li_2SO_4$-20 mole percent LiCl at 760° C. for 2 minutes, immersed in $LiNO_3$ at 360° C. for 16 hours. | 20,000 |
| 2 | None, as annealed | 7,000 |
| 2 | Immersed in $KNO_3$ at 525° C. for 6 hours | 60,000 |
| 2 | Immersed in 80 mole percent $Li_2SO_4$-20 mole percent LiCl at 750° C. for 5 minutes. | 15,000 |
| 2 | Immersed in 80 mole percent $Li_2SO_4$-20 mole percent LiCl at 750° C. for 15 minutes. | 20,000 |
| 2 | Immersed in 80 mole percent $Li_2SO_4$-20 mole percent LiCl at 750° C. for 15 minutes, immersed in $LiNO_3$ at 360° C. for 4 hours. | 30,000 |
| 3 | None, as annealed | 7,500 |
| 3 | Immersed in $KNO_3$ at 400° C. for 4 hours | 15,000 |
| 3 | Immersed in 80 mole percent $Li_2SO_4$-20 mole percent LiCl at 750° C. for 5 minutes. | 13,000 |
| 3 | Immersed in 80 mole percent $Li_2SO_4$-20 mole percent LiCl at 750° C. for 5 minutes, immersed in $LiNO_3$ at 350° C. for 16 hours. | 24,000 |

Table II demonstrates the great improvement in strength, as compared to annealed glass, which this two step ion exchange method can impart. The duration of the first step should ordinarily not exceed about 30 minutes since deformation of the article can occur and the exchange is so rapid that further time is unnecessary. As a matter of fact, a treatment time as short as one minute can be adequate at these high temperatures. About 8 hours has been deemed to be a practical maximum treating time for the second step since there appears to be little, if any, further increase in strength engendered thereby. At least about one-half hour has been deemed necessary to insure substantial ion exchange taking place at these low temperatures.

In order to demonstrate the effectiveness of the invention in minimizing delayed breakage due to bruise checks, small glass squares about 2 inch × 0.1 inch thick were cut from the large square patties and then ground and polished. These squares were not subjected to the tumble abrasion test described above with respect to the cane samples but no special precautions were exercised in their handling either. After the strengthening treatment, the squares were exposed to a test designed to simulate the type of impact found to create bruise checks in tumblers and similar types of products.

This test consisted of stroking the surface of the sample with a carbide point of 0.002-inch radius. The point was fixed in a ¼ inch × ¼ inch × 5 ½ inch cold rolled steel arm supported at the axis of rotation by two cone bearings. It was located at the center of percussion to maximize the energy transfer. The amount of energy transfer was calculated from the formula $$E = \frac{ml}{2}(1 - \cos \theta)$$

where $m$ = mass of the arm
$l$ = length of the arm to the center of gravity
$\theta$ = angular displacement of the arm The samples of impacting were taped to aid identification of the break origin and held firmly against a ½-inch-solid phenolic resin block to prevent any flexure which would distort the resulting values.

The tests indicated that the impact energy required to break squares treated in accordance with the present invention either immediately or resulted in spontaneous breakage during the next seven days after the test was at least twice that required when the squares had been strengthened through the high temperature or low temperature ion exchange process alone. This fact is significant of the great beneficial effect which the present invention has upon preventing delayed breakage.

Table II is believed to clearly illustrate the advantageous properties which this invention endows to sodium and/or potassium silicate glasses. Hence, while not providing as high strength to such glasses as the single large-ion-for-small-ion-type exchange or the single small-ion-for-large-ion-type exchange, the improvement in strength, when compared to annealed glass, is extremely significant. Finally, the breaking characteristics of the glass strengthened in accordance with this invention are quite similar to those of annealed glass, i.e., the violence of breakage is very low and the glass fragments into large pieces rather than dicing.

The cause for this improvement with respect to delayed breakage accompanied with the breakage character of annealed glass is believed to be apparent from a study of FIg. 4 which represents the stress profile of example 1 immersed first in the 80 mole percent Li$_2$SO$_4$-20 mole percent LiCl bath at 750° C. for 15 minutes and then immersed in the LiNO$_3$ bath at 350° C. for 3 hours. Thus, as compared with FIGS. 2 and 3, the compressive stresses developed in the surface layer are not as high in value but the depth of the compression layer is substantially greater. Hence, whereas the degree of strengthening resulting from the instant invention is not as high as that obtained through the individual exchange reactions diagrammatically represented in FIGS. 2 and 3, the compression layer has been moved to a point further interior in the glass. Therefore, upon impact, a bruise check must propagate through this deeper compression layer before fracture can occur and, inasmuch as the compression stresses are not so extreme, the violence of breakage is much less intense.

A further significant practical advantage which the instant invention imparts is resistance to thermal fatigue. Thus, glass articles strengthened in accordance with this invention can be heated to temperatures as high as about 500° C. and no substantial loss in strength will be observed even after exposure to such temperatures for 64 hours.

This invention is of particular utility with glass articles produced from sodium and/or potassium aluminosilicate and sodium and/or potassium zirconosilicate glasses. Such glasses are unique in their ability to develop high abraded strength after the two-step ion exchange. These glasses commonly contain about 5-25 percent by weight Na$_2$O and/or K$_2$O, 5-25 percent by weight Al$_2$O$_3$ and/or ZrO$_2$, and the remainder essentially SiO$_2$. Other known compatible metal oxides may, optionally, be included in individual amounts normally less than about 10 percent by weight, the total of such additions not exceeding about 20 percent by weight. When Al$_2$O$_3$ is present in substantial amounts, TiO$_2$ should be held under 3 percent by weight to preclude the development of crystallization if a transparent article is desired.

FIG. 2 represents the stress profile of example 1 which had been immersed in a molten bath of KNO$_3$ at 500° C. for 4 hours.

FIG. 3 represents the stress profile of example 1 which had been immersed in a molten bath of 80 mole percent Li$_2$SO$_4$-20 mole percent LiCl at 750° C. for 15 minutes.

If desired, the consecutive ion exchange reaction of this invention may be followed with an exchange of sodium and/or potassium ions with lithium ions in the glass surface by contacting the consecutively-exchanged glass with a source of sodium and/or potassium ions or air heated in accordance with U.S. Pat. No. 3,395,998 at a temperature below the strain point of the glass. This three-step exchange increases the depth of the compression layer still further, thereby improving the resistance of the glass to bruise checking. However, the compressive stress values are also raised substantially such that explosive fragmentation upon breakage is hazarded. In general, a contact period of about one-half to 8 hours has been found satisfactory to insure substantial exchange. FIG. 5 is illustrative of the stress profile exhibited by example 1 which had been immersed in molten 80 mole percent Li$_2$SO$_4$-20 mole percent LiCl at 760° C. for 15 minutes, then immersed in molten LiNO$_3$ at 360° C. for 1 hour, and, finally, immersed in molten NaNO$_3$ at 400° C. for 4 hours. After abrasion, the glass demonstrated a modulus of rupture of 57,000 p.s.i. with a depth of compressive layer of 0.017 inch.

We claim:

1. A method for strengthening a sodium and/or potassium silicate glass article which comprises the two steps:
   a. contacting said glass article with a source of lithium ions in the form of a molten salt bath at a temperature above the strain point of the glass but below the softening point thereof for a time sufficient to permit lithium ions to diffuse into the glass surface in exchange for sodium and/or potassium ions of the glass; and, thereafter,
   b. contacting said glass article with a source of lithium ions in the form of a molten salt bath at a temperature of at least 200° C. but below the strain point of the glass for a time sufficient to cause an exchange to occur between sodium and/or potassium ions from the inner portion of said glass article and the lithium ions introduced into the glass surface in the first exchange at a point interior to said glass surface.

2. A method according to claim 1 wherein said glass article consists essentially, by weight on the oxide basis, of about 5-25% Na$_2$O and/or K$_2$O, 5-25% Al$_2$O$_3$ and/or ZrO$_2$ and SiO$_2$.

3. A method according to claim 1 wherein the time sufficient to permit lithium ions to diffuse into the glass surface in exchange for sodium and/or potassium ions of the glass ranges between about 1-30 minutes.

4. A method according to claim 1 wherein the time sufficient to cause an exchange to occur between sodium and/or potassium ions from the inner portion of the glass article and the lithium ions introduced in the first exchange ranges between about one-half to 8 hours.

5. A method for strengthening sodium and/or potassium silicate glass article according to claim 1 wherein, after said article has been contacted with a source of lithium ions at a temperature above the strain point of said glass but below the softening point thereof and then contacted with a source of lithium ions at a temperature of at least 200° C. but below the strain point of the glass, said glass article is contacted with a source of sodium and/or potassium ions at a temperature of at least 200° C. but below the strain point of the glass for a time sufficient to cause an exchange to occur between lithium ions in the glass surface and said sodium and/or potassium ions.

6. A method according to claim 5 wherein said glass article consists essentially, by weight on the oxide basis, of about 5–25% $Na_2O$ and/or $K_2O$, 5–25% $Al_2O_3$ and/or $ZrO_2$, and $SiO_2$.

7. A method according to claim 5 wherein the time sufficient to cause an exchange to occur between lithium ions in the glass surface and said sodium and/or potassium ions ranges between about one-half to 8 hours.

* * * * *